(12) United States Patent
Hubbe

(10) Patent No.: US 7,614,535 B2
(45) Date of Patent: Nov. 10, 2009

(54) LIGHT BAG RACK FOR A BICYCLE

(76) Inventor: Raymond E. Hubbe, 222 Strong St., Amherst, MA (US) 01002

(*) Notice: Subject to any disclaimer, the term of this patent is extended or adjusted under 35 U.S.C. 154(b) by 820 days.

(21) Appl. No.: 11/061,580

(22) Filed: Feb. 18, 2005

(65) Prior Publication Data

US 2006/0186160 A1 Aug. 24, 2006

(51) Int. Cl.
*B62J 7/06* (2006.01)
*B62J 7/00* (2006.01)

(52) U.S. Cl. .................. 224/427; 224/420; 224/421; 224/453; 224/457; 224/463

(58) Field of Classification Search ............ 224/427, 224/275, 924, 420, 421, 453, 457, 463; 248/352, 248/503.1
See application file for complete search history.

(56) References Cited

U.S. PATENT DOCUMENTS

| | | | |
|---|---|---|---|
| 637,762 A * | 11/1899 | Buley et al. ................. 224/458 |
| 4,415,105 A * | 11/1983 | Jackson ....................... 224/447 |
| 4,566,617 A | 1/1986 | Jackson |
| 4,643,343 A | 2/1987 | Goldman et al. |
| D296,884 S * | 7/1988 | Coue .......................... D12/114 |
| 5,127,563 A | 7/1992 | Chan et al. |
| 5,190,345 A * | 3/1993 | Lin ........................ 297/188.12 |
| D336,740 S | 6/1993 | Graf |
| 5,341,971 A | 8/1994 | Newbold et al. |
| 5,356,058 A | 10/1994 | Fenton |
| 5,395,017 A | 3/1995 | Naughton |
| 5,655,694 A * | 8/1997 | Keckeisen ................... 224/430 |
| 5,842,581 A * | 12/1998 | Graefe ......................... 211/17 |
| 5,931,361 A | 8/1999 | Schwimmer |
| 7,000,811 B2 * | 2/2006 | Gilstrap et al. .............. 224/420 |

* cited by examiner

*Primary Examiner*—Nathan J Newhouse
*Assistant Examiner*—Lester L Vanterpool
(74) *Attorney, Agent, or Firm*—Malcolm J. Chisholm, Jr.

(57) ABSTRACT

A light bag rack (10) for a bicycle includes a U-shaped frame (42) having first and second rods (48, 50) extending between a closed securing end (44) and an open mounting end (46) of the rack (10) and defining a pinch point (52) between the ends (44, 46). The rods (48, 50) are sufficiently flexible to permit the open mounting end (46) to expand around first and second bicycle seat frame rails (16, 18) forward of a seat post (14) and to pass between the seat frame rails (16, 18) rearward of the seat post (14) so that the closed securing end (44) contacts the seat frame rails (16, 18) forward of the seat post (14) to secure the rack (10) to the seat frame rails (16, 18). A load portion (70) of the rack (10) supports a utility bag (84).

15 Claims, 3 Drawing Sheets

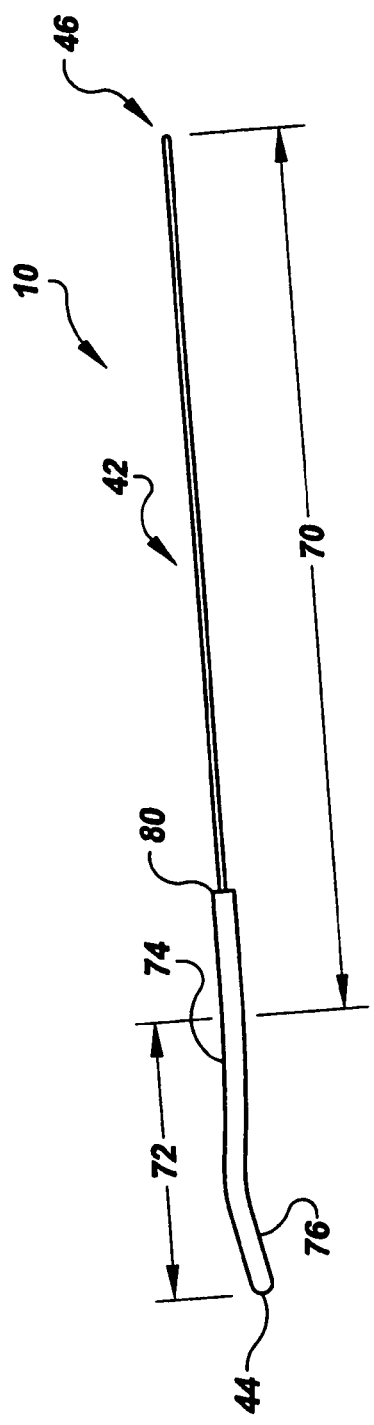
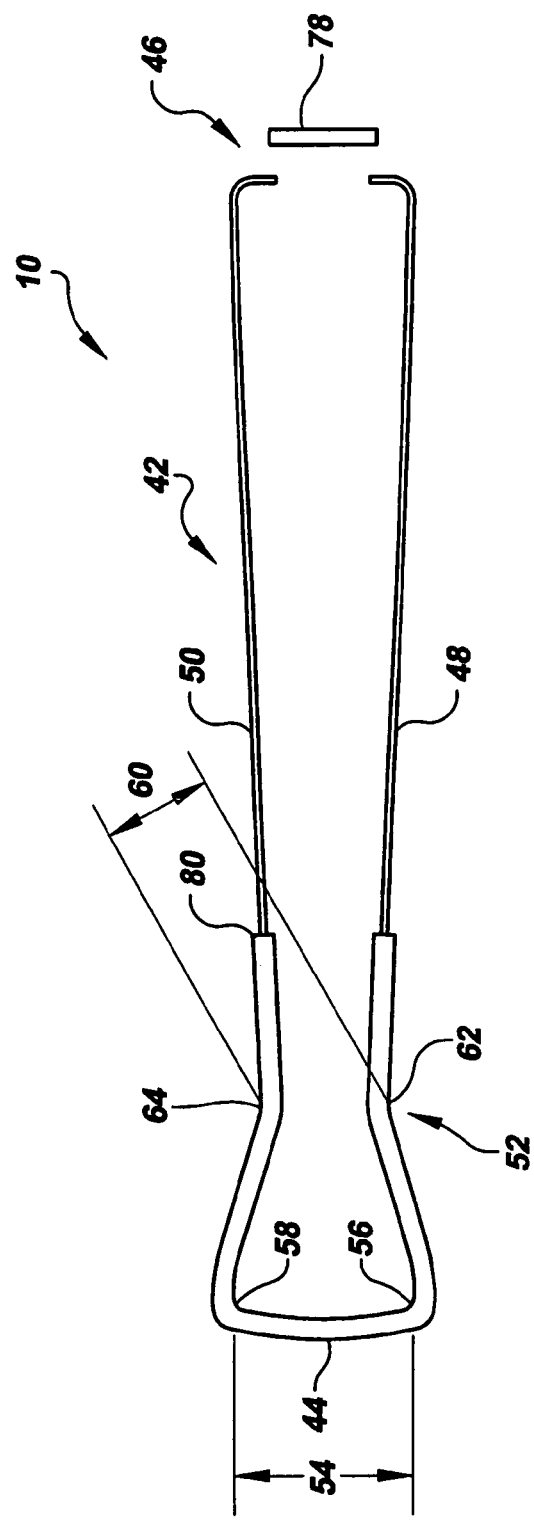
FIG. 2
FIG. 3

LIGHT BAG RACK FOR A BICYCLE

TECHNICAL FIELD

The present invention relates to apparatus that can be secured to a bicycle to carry articles as the bicycle is driven and especially relates to a very light bag rack that can be easily secured to a bicycle.

BACKGROUND ART

It is well known that bicyclists often desire to bring various articles with them as they travel on their bicycles. Such articles include tire repair kits, bicycle accessories, light clothing for variable weather, food snacks, etc. For competitive bicyclists that endeavor to travel long distances at competitive speeds, it is extremely desirable that bicycle bag support structures be as light and as uncomplicated as possible. Many structures are known in the art for efficiently securing a utility bag to a bicycle.

For example, a "Seat Pack Assembly" is disclosed in U.S. Pat. No. 4,566,617 that issued on Jan. 28, 1986 to Jackson which includes a U-shaped mounting bracket that receives a custom made bag. The mounting bracket, however, must be screwed to components of a bicycle seat using complicated clamps, plates, screws, nuts, etc. Upon fastening the serpentine bracket to the seat, the bracket may be squeezed and then inserted into a pocket of a custom designed bag, which is also strapped to a seat post of the bicycle. While requiring no frame struts to a wheel axle, the assembly of Jackson nonetheless involves time consuming, heavy, complicated and costly components to be effectively utilized. Similarly, a "Cantilevered Article Carrier" is shown in U.S. Pat. No. 4,643,343 that issued on Feb. 17, 1987 to Goldman et al. which also includes a bracket secured to a seat with clamps, nuts, bolts, etc. The bracket extends rearward from the seat to be mechanically secured to a plastic hinge-shaped bag frame that supports an encompassing fabric bag. The bag is also secured to the seat post by a "Velcro" strap. Like Jackson, however, the carrier of Goldman et al. requires time-consuming mechanical brackets that may vibrate off, and that are heavy and costly to make and use.

Another and more recent "Mounting Device for Bicycle Accessories" is shown in U.S. Pat. No. 5,127,563 that issued on Jul. 7, 1992 to Chan et al. The device of Chan et al. includes a cleat secured to a bag frame material within a bag and the cleat projects out of the custom designed bag. The cleat includes wings that engage frame bars of the seat of the bicycle while the bag is also secured against sliding by a "Velcro" strap to the seat post. Like Jackson and Goldman, et al, the device of Chan et al. includes complicated, costly and heavy hardware, and includes a custom made fabric bag of limited size that must be mated to the complicated cleat and bag frame. A somewhat simpler design of a bike rack is shown in a "Cantilevered Carrier Rack for Bicycle" disclosed in U.S. Pat. No. 5,395,017 that issued on Mar. 7, 1995 to Naughton. The carrier of Naughton simply includes a support arm extending from the seat post over the rear bicycle tire. The carrier also utilizes a seat post abutment fork and a "rail hanger" secured between the support arm and frame rails of the seat to secure the support arm. While Naughton's carrier is less complicated than most known bicycle carrier racks, it still involves the cost and weight of the rail hanger and abutment fork components, and the rail hanger is susceptible to vibrating and possible dislocation, etc.

Accordingly, there is a need for a bicycle rack that is efficient to manufacture and use, that is light, durable and can be readily secured to and removed from a bicycle.

SUMMARY OF THE INVENTION

The invention is a light bag rack for a bicycle that can be quickly secured to and removed from a bicycle with no tools; that requires no separate fastening apparatus such as bolts and nuts; and, that can be made of ordinary metals or ultra-light, modern composite materials. The light bag rack is dimensioned to be firmly secured to common components of seats of modern bicycles. Such bicycle seats are supported on a seat post, and the seat includes a first frame rail and a second frame rail secured to the post. Parallel portions of the first and second frame rails adjacent the seat post are aligned approximately parallel to each other for a limited distance, and they extend in a direction parallel to a direction-of-travel axis of the bicycle.

The parallel portions of the first and second frame rails define a first seat-frame distance and a second seat-frame distance. The first seat-frame distance is a shortest distance between exterior edges of the frame rails forward of the seat post in a direction toward a front of the bicycle. The second seat-frame distance is a shortest distance between interior edges of the frame rails rearward of the seat post in a direction toward a rear of the bicycle.

The light bag rack includes an approximately U-shaped frame having a closed securing end, and an opposed open mounting end. A first rod and a second rod extend between the closed securing end and the open mounting end, and the first and second rods define a pinch point between the securing and mounting ends. The first and second rods also define a first rack distance and a second rack distance. The first rack distance is a shortest distance between interior edges of the first and second rods adjacent the closed securing end of the rack. The first rack distance is greater than the first seat-frame distance defined by the seat frame rails. The second rack distance is a shortest distance between exterior edges of the first and second rods at the pinch point, and the second rack distance is less than the second seat-frame distance of the seat frame rails.

In use of the rack, the first and second rods of the rack are sufficiently flexible so that the open mounting end expands around the exterior edges of the first and second seat frame rails forward of the seat post to insert the rack through the frame rails. The first and second rods next compress between the first and second seat frame rails rearward of the seat post whenever the securing end of the rack is positioned to contact the exterior edges of the first and second frame rails forward of the seat post. Simultaneously, the first and second rods adjacent the pinch point of the rack contact the interior edges of the first and second frame rails to permit the rack to be secured to the first and second frame rails of the seat.

The parallel portions of the first and second seat frame rails may include first and second knee segments wherein the rails bend upward away from the seat post. In such an embodiment of the seat, the first and second rods adjacent the pinch point of the rack may contact the interior edges of the first and second frame rails within the knee segments of the frame rails, thereby minimizing any necessary curvature of the first and second rods to secure the rack within the frame rails.

In a preferred embodiment, the light bag rack may define curvature or bending of the first and second rods to facilitate securing the rods within the seat frame rails. A load support portion of the rack includes portions of the first and second rods extending from the pinch point to the open mounting end. The load support portion defines a load plane that is parallel to a plane defined between and along the first and second rods in the load support portion of the rods. The first and second rods define an upside-down V-segment between the pinch point and the closed securing end of the rack. A first segment of the upside-down V-segment adjacent the pinch point ascends above the load plane in a direction toward the closed securing end of the rack at an angle of about between 1 and 20 degrees relative to the load plane. A second segment of the upside-down V-segment extends from the first segment to the closed securing end and descends back down toward the load plane at an angle of about 18 degrees relative to the first segment of the upside-down V-segment. (For purposes herein, the word "about" is to mean plus or minus 25 percent.) In such a preferred embodiment, the load support portion of the first and second rods may be about between 4 and 20 inches, and the upside-down V-segment of the rods may be about 3.5 inches. Additionally, the first and second rods within the upside-down V-segment may bend toward each other from the closed securing end to the pinch point at an angle of about 80 degrees relative to a line defined by the closed contact end of the rack. The first and second rods bend back away from each other to be about parallel to each other from the pinch point and through the load support portion of the rack.

In a further preferred embodiment, the light bag rack may include an attachment sleeve such as a tube made of metal or plastic that is dimensioned to receive and secure opposed ends of the open mounting end of the rack. In use, the attachment sleeve is easily detached by sliding the flexible rods out of the tube while inserting the rack through the first and second frame rails of the seat. When the closed securing end contacts the exterior edges of the seat frame rails and the rods contact the interior edges of the rails, the attachment sleeve may be inserted on to the ends of the first and second rods at the open end to stabilize the rods against movement, and to facilitate insertion of the rods into a sleeve of a utility bag secured to the load portion of the rods.

In an additional embodiment, the rack may include a resilient contact sleeve, such as a soft plastic sleeve or a coating of a resilient material, that encompasses the closed securing end of the rack and the first and second rods from the securing end to beyond the pinch point in order to minimize scratching of the seat frame rails, and to facilitate secure and silent contact between the rack rods and seat frame rails. The light bag rack may also include a securing strap fastened to the closed securing end of the rack that may be quickly secured to the seat post to prevent the rack from sliding forward away from the seat post in a direction toward the front of the bicycle.

Any common flexible utility bag may be readily secured to the light bag rack because of the convenient first and second rods extending rearward from the seat post. However, a preferred utility bag includes a receiving sleeve into which the load support portion of the first and second rods may be inserted. Such a bag would also include a central enclosure for storing bicycle accessories, and a securing strap, such as a "Velcro" strap, could extend from the bag to surround the seat post. A similar securing strap could be utilized to compress the bag about the load support portion of the first and second rods to thereby minimize the size of the bag and to further secure the bag against accidental dislocation of the bag from the rack.

Accordingly, it is a general purpose of the present invention to provide a light bag rack for a bicycle that overcomes deficiencies of the prior art.

It is a more specific purpose to provide a light bag rack for a bicycle that may be quickly secured to and removed from a bicycle without need for tools; that requires no separate fastening apparatus; and that is extremely light, durable and inexpensive to manufacture and easy to utilize.

These and other purposes and advantages of the present light bag rack for a bicycle will become more readily apparent when the following description is read in conjunction with the accompanying drawings.

BRIEF DESCRIPTION OF THE DRAWINGS

FIG. 2 is a side plan view of a light bag rack for a bicycle showing the rack separated from a bicycle seat.

FIG. 3 is a top plan view of the light bag rack of FIG. 2.

DESCRIPTION OF THE PREFERRED EMBODIMENTS

Figure 1:
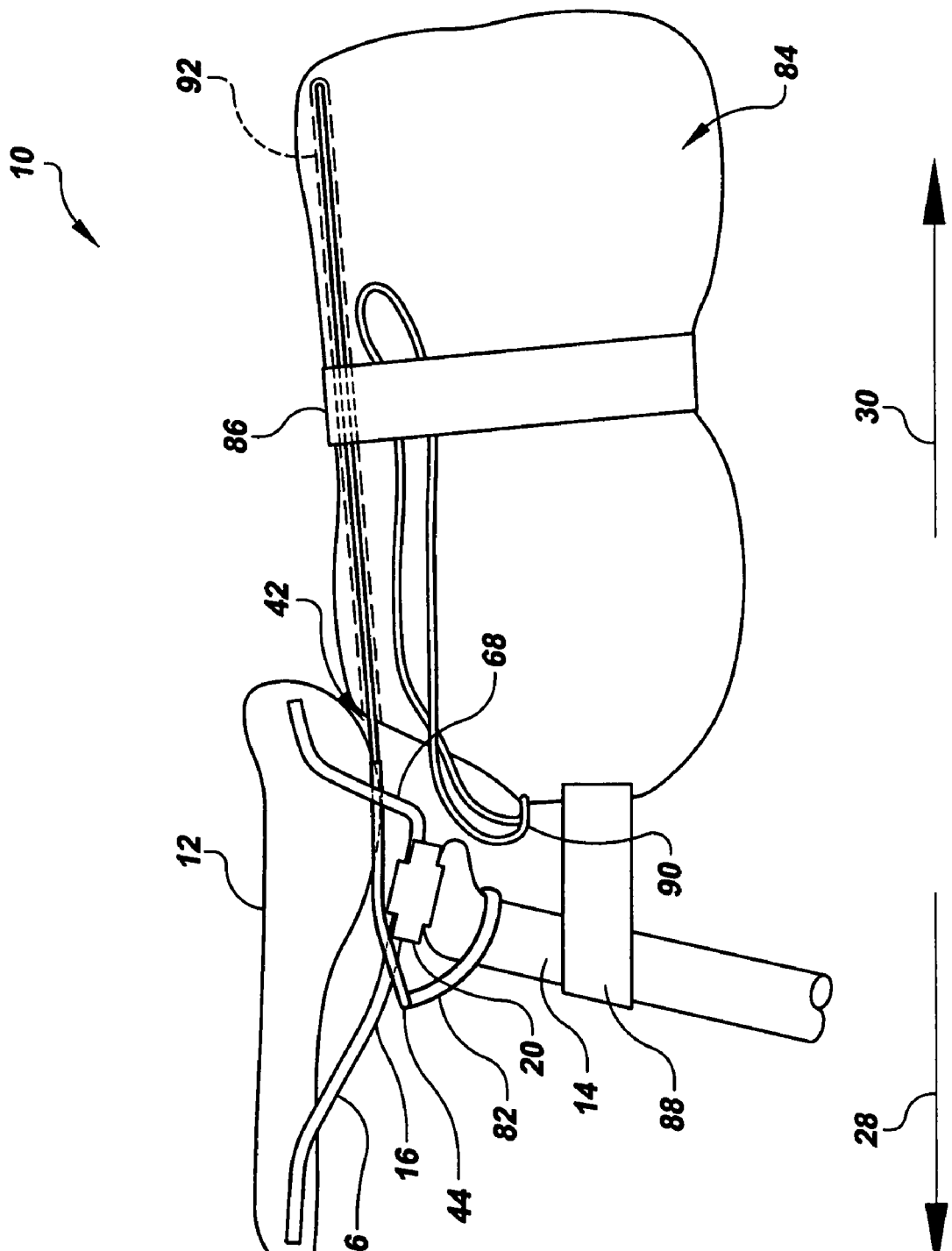
FIG. 1 is a side plan view of a light bag rack for a bicycle constructed in accordance with the present invention showing the light bag rack secured to a seat of a bicycle and supporting a utility bag.
Figure 4:
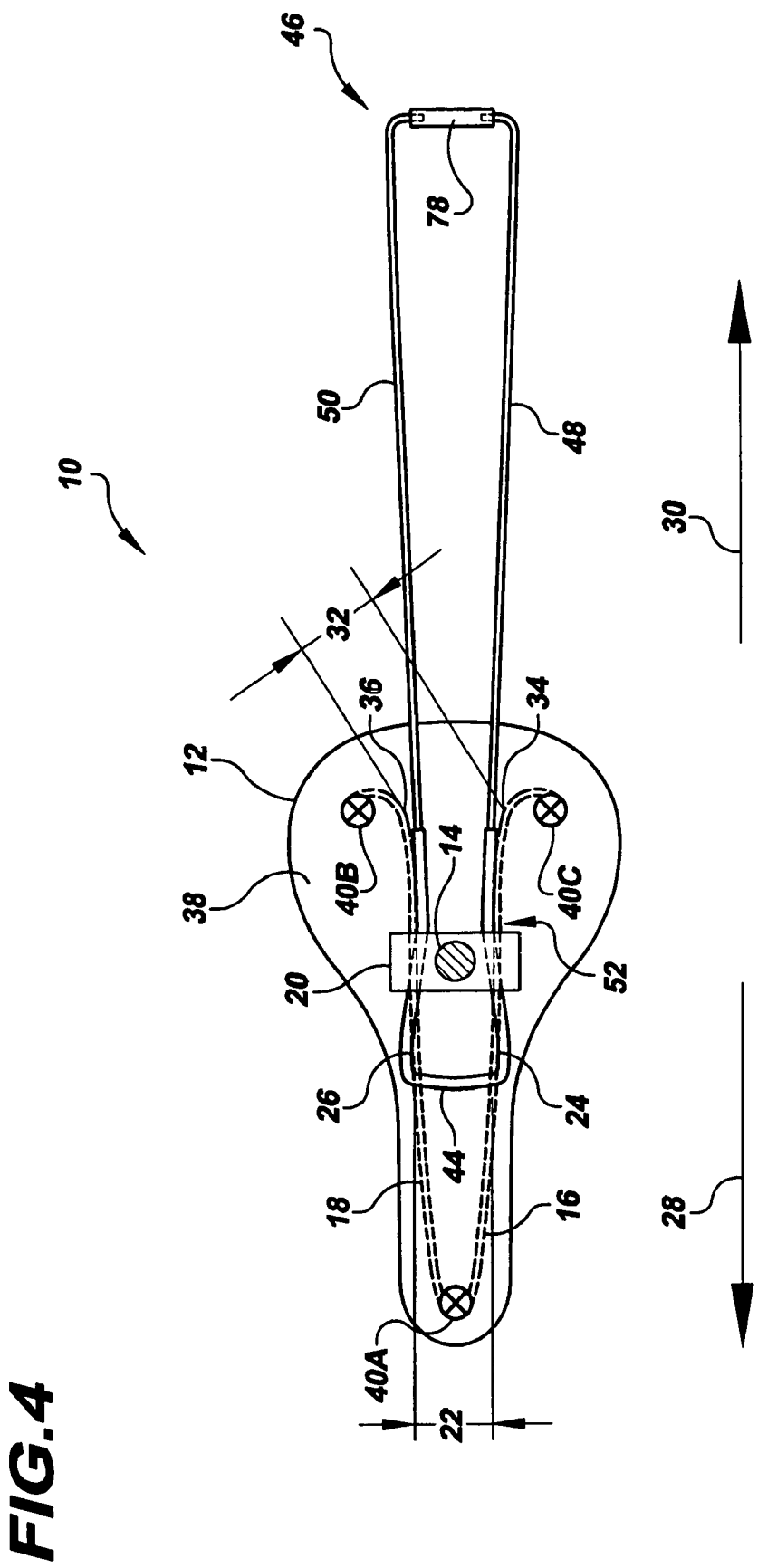
FIG. 4 is a bottom plan view showing a light bag rack for a bicycle constructed in accordance with the present invention secured to first and second frame rails of a bicycle seat.

Referring to the drawings in detail, a light bag rack for a bicycle is shown in FIG. 1, and is generally designated by the reference numeral 10. The light bag rack 10 is shown in FIG. 1 secured to a seat 12 that is supported on a seat post 14. As best shown in FIG. 4, the seat 12 includes a first frame rail 16 and a second frame rail 18. A seat bracket 20 secures the frame rails 16, 18 to the seat post 14. Parallel portions of the first and second frame rails 16, 18 adjacent the seat post 14 are aligned approximately parallel to each other for a limited distance and the rails extend in a direction about parallel to a direction-of-travel axis of the bicycle (not shown) to which the seat post 14 is secured. The parallel portions of the frame rails 16, 18 define a first seat-frame distance that is represented in FIG. 4 by reference numeral 22. The first seat-frame distance 22 is a shortest distance between an exterior edge 24 of the first frame rail 16 and an exterior edge 26 of the second frame rail 18 forward of the seat post 14 in a direction toward a front of the bicycle (not shown). (The direction "toward a front of the bicycle" is designated by arrow-28 in FIG. 4, and a direction "toward a rear of the bicycle" is designated by arrow 30 in FIG. 4.) The parallel portions of the first and second frame rails 16, 18 adjacent the seat post 14 also define a second seat-frame distance that is represented in FIG. 4 by reference numeral 32. The second seat-frame distance 32 is a shortest distance between an interior edge 34 of the first frame rail 16 and an interior edge 36 of the second frame rail 18 rearward of the seat post in the direction 30 toward the rear of the bicycle (not shown). As seen in FIG. 4, the frame rails 16, 18 may be secured to a seat cushion 38 by a plurality of fasteners 40A, 40B, 40C.

The light bag rack 10 is best shown separated from the seat 12 in FIGS. 2 and 3, and includes an approximately U-shaped frame 42 having a closed securing end 44 and an opposed open mounting end 46. A first rod 48 and a second rod 50 extend between the closed securing end 44 and the open mounting end 46, and the first and second rods 48, 50 also define a pinch point 52 between the securing end 44 and the mounting end 46. The first and second rods 48, 50 also define a first rack distance that is represented in FIG. 3 by the reference numeral 54. The first rack distance 54 is a shortest distance between an interior edge 56 of the first rod 48 adjacent the closed securing end 44 and an interior edge 58 of the second rod 50 adjacent the securing end 44. The first rack distance 54 is greater than the first seat-frame distance 22 of the seat frame rails 16, 18. The first and second rods 48, 50 also define a second rack distance that is represented in FIG. 3 by the reference numeral 60. The second rack distance 60 is a shortest distance between an exterior edge 62 of the first rod 48 and an exterior edge 64 of the second rod 50 adjacent the pinch point 52. The second rack distance 60 is less than the second seat-frame distance 32 of the seat frame rails 16, 18.

As best seen in FIG. 4, the light bag rack 10 is secured to the bicycle seat 12 by expanding the open mounting end 46 around the exterior edges 24, 26 of the first and second seat frame rails 16, 18 forward of the seat post 14. Next, the first and second rods 48, 50 of the rack 10 are compressed toward each other so that the rods 48, 50 may pass between the interior edges 34, 36 of the frame rails 16, 18 rearward of the seat post 14 in the direction 30 toward the rear of the bicycle (not shown). The closed securing end 44 of the rack 10 is then moved in the direction 30 toward the rear of the bicycle until the interior edges 56, 58 of the rods 48, 50 adjacent the closed securing end 44 of the rack abut the exterior edges 24, 26 of the seat frame rails 16, 18 forward of the seat post 14. Simultaneously, the exterior edges 62, 64 of the first and second rods 48, 50 adjacent the pinch point 52 contact the interior edges 34, 36 of the first and second seat frame rails 16, 18. In this manner the rack 10 is effectively threaded through the seat frame rails 16, 18 to secure the rack 10 within the seat frame rails 16, 19 without any need for tools, brackets, clamps, screws, nuts, bolts, etc. The first and second rods 48, 50 may be constructed of any material that provides sufficient flexibility to permit the described expansion and compression of the rods 48, 50 through the seat frame rails 16, 18, such as known steels, aluminum, alloys thereof, modern, ultra-light composite materials such as graphite fibers, carbon materials, etc.

As best seen in FIG. 1, the seat frame rails 16, 18 (only 16 is shown in FIG. 1) may include a nose segment 66 that ascends up and away from the seat post 14 in the direction 28 toward the front of the bicycle (not shown). Additionally, the frame rails 16, 18 may include a knee segment 68 that ascends up and away from the seat post 14 in the direction 30 toward the rear of the bicycle. As can be understood by one skilled in the art, most bicycle seat frames have such ascending nose and knee segments 66, 68 which facilitate the threading of the present light bag rack through the frame rails 16, 18. In such seat frame rail embodiments, the first and second rods 48, 50 adjacent the pinch point 52 may contact the interior edges 34, 36 of the frame rails 16, 18 within the knee segment 68 of the frame rail 16. Such an embodiment minimizes any necessary curvature of the first and second rods 48, 50 of the light bag rack 10 to firmly and quickly secure the rack 10 within the frame rails 16, 18 of the seat 12.

As best shown in FIG. 2, in a preferred embodiment, the light bag rack 10 may define curvature or bending of the first and second rods 48, 50 to facilitate securing the rods within the seat frame rails 16, 18. A load support portion 70 of the rack 10 includes portions of the first and second rods 48, 50 extending from the pinch point 52 to the open mounting end 46. The load support portion 70 defines a load plane that is defined between and along the first and second rods 48, 50 in the load support portion 70 of the rods 48, 50. The first and second rods 48, 50 define an upside-down V-segment 72 between the pinch point 52 and the closed securing end 44 of the rack 10. A first segment 74 of the upside-down V-segment 72 adjacent the pinch point 52 ascends above the load plane in a direction toward the closed securing end 44 of the rack 10 at an angle of about between 1 and 20 degrees relative to the load plane. A second segment 76 of the upside-down V-segment extends from the first segment 74 to the closed securing end 44 and descends back down toward the load plane at an angle of about 18 degrees relative to the first segment 74 of the upside-down V-segment. (For purposes herein, the word "about" is to mean plus or minus 25 percent.) In such a preferred embodiment, the load support portion 70 of the first and second rods 48, 50 may be about between 4 and 20 inches, and the upside-down V-segment 72 of the rods may be about 3.5 inches. Additionally and as best shown in FIG. 3, the first and second rods 48, 50 within the upside-down V-segment 72 may bend toward each other from the closed securing end 44 to the pinch point 52 at an angle of about 80 degrees relative to a line defined by the closed contact end 44 of the rack 10. The first and second rods 48, 50 bend back away from each other to be about parallel to each other from the pinch point 52 and through the load support portion 70 of the rack 10.

The light bag rack 10 may also include an attachment sleeve 78, such as a tube made of metal or plastic or any know materials capable of performing the described function of the sleeve 78. The attachment sleeve 78 is dimensioned to receive and secure the first and second rods 48, 50 at the open mounting end 46 of the rack 10. In use of the rack 10, the attachment sleeve 78 is easily detached by sliding the ends of the first and second rods 48, 50 at the mounting end 46 out of the sleeve 78 so that the open mounting end 46 may be expanded to go around the seat frame rails 16, 18 forward of the seat post 14 and may be compressed to pass between the rails 16, 18 rearward of the seat post. Then, the ends of the first and second rods 16, 18 are slid into the attachment sleeve 78 to stabilize the rods 16, 18 against movement.

The light bag rack 10 may also include a resilient contact sleeve 80, such as a soft plastic sleeve or a coating of a resilient material that encompasses the closed securing end 44 of the rack 10 and the first and second rods 48, 50 from the securing end 44 to the pinch point 52. Such a resilient sleeve 80 minimizes scratching of bicycle components by the rack 10 during usage, and also facilitates a secure and silent contact between the rack 10 and the seat frame rails 16, 18. As shown in FIG. 1, a securing strap 82, such as a "Velcro" brand-name strap, may be attached to the closed securing end 44 of the rack 10. Whenever the rack 10 is secured to the seat 12, the securing strap 82 may be wrapped around the seat post 14 to restrict any movement of the rack in the forward direction 28 away from the seat post 14 during usage of the bicycle (not shown).

The light bag rack 10 may also include a flexible utility bag 84, as shown in FIG. 1. Such a utility bag may be secured to the light bag rack 10 by any known securing means, including a "Velcro" brand-name first binding strap 86 that wraps the bag to the load support portion 70 of the rack 10. A second binding strap 88 may also be secured between the bag 84 and the seat post 14 to further secure the bag against sliding off of the rack 10. Additional binding straps (not shown) may be included to reduce the profile of the bag 10 and to even further reduce the likelihood of accidental dislocation of the bag 84 from the rack 10. The bag 84 shown in FIG. 1 also includes a draw-string 90 to secure an opening to an interior of the bag, as is well known in the art. The bag 84 may also include a rack pocket 92 (shown in hatched lines in FIG. 1) dimensioned to receive the load portion 70 of the rack 10 to facilitate securing the bag 84 to the rack.

As is apparent, the light bag rack 10 of the present invention provides an extraordinarily efficient, light and durable rack for supporting bicycle accessories, clothes, food, etc. Unlike known bicycle racks, the light bike rack may be readily secured to and removed from a standard bicycle by a user without any requirement for hand tools. Additionally, the light bag rack 10 requires no separate attachment brackets, clamps or cleats etc. Further, the present rack does not require a customized-designed bag made for elaborate and specific bag frames. Even if used with first and second rods 48, 50 made of known metals, the rack 10 is inherently light by design. However, because of its elegant design, the light bag rack may also be made of ultra-light, modern materials, such as carbon fibers, etc. to provide the lightest possible bag rack for competitive bicyclists.

The patent documents identified above are hereby incorporated herein by reference.

While the present invention has been disclosed with respect to the described and illustrated embodiments, it is to be understood that the invention is not to be limited to those embodiments. Accordingly, reference should be made primarily to the following claims rather than the foregoing description to determine the scope of the invention.

What is claimed is:

1. A light bag rack (10) for a bicycle, wherein the bicycle includes a seat (12) supported on a seat post (14), the seat (12) including a first frame rail (16) and a second frame rail (18) secured to the post (14) wherein parallel portions of the first and second frame rails (16, 18) adjacent the seat post (14) are aligned about parallel to each other and extend in a direction parallel to a direction of travel axis of the bicycle, and wherein the parallel portions of the first and second frame rails (16, 18) define a first seat-frame distance (22) being a shortest distance between exterior edges (24, 26) of the frame rails (16, 18) forward of the seat post (14) in a direction (29) toward a front of the bicycle and the parallel portions of the first and second frame rails (16, 18) define a second seat-frame distance (32) being a shortest distance between interior edges (36, 34) of the frame rails (16, 18) rearward of the seat post (14) in a direction (30) toward a rear of the bicycle, the light bag rack (10) comprising:

a. an approximately U-shaped frame (42) having a closed securing end (44), an opposed open mounting end (46), a first rod (48) and a second rod (50) extending between the closed securing end (44) and the open mounting end (46), and the first and second rods (48, 50) defining a pinch point (52) between the securing and mounting ends (44, 46);

b. wherein the first and second rods (48, 50) define a first rack distance (54) being a shortest distance between interior edges (56, 58) of the first and second rods (48, 50) adjacent the securing end (44) so that the first rack distance (54) is greater than the first seat-frame distance (22);

c. wherein the first and second rods (48, 50) define a second rack (60) distance being a shortest distance between exterior edges (64, 66) of the first and second rods (48, 50) at the pinch point (52) so that the second rack distance (60) is less than the second seat-frame distance (32);

d. wherein the first and second rods (48, 50) of the rack (10) are sufficiently flexible so that the open mounting end (46) may expand around the exterior edges (24, 26) of the first and second seat frame rails (16, 18) forward of the seat post (14) and may compress between the first and second seat frame rails (16, 18) rearward of the seat post (14) whenever the securing end (44) of the rack (10) is positioned to contact the exterior edges (24, 26) of the first and second frame rails (16, 18) forward of the seat post (14) while the first and second rods (48, 50) adjacent the pinch point (52) of the rack (10) contact the interior edges (34, 36) of the first and second frame rails (48, 50) to secure the rack (10) to the first and second frame rails (16, 18) of the seat (12) and, e. wherein the rack (10) includes an attachment sleeve (78) dimensioned to detachably receive and secure the first and second rods (48, 50) at the open mounting end (46) of the rack (10).

2. The light bag rack (10) for a bicycle of claim 1, wherein the first and second rods (48, 50) define an upside-down V-segment (72) between the pinch point (52) and the closed securing end (44) of the rack (10), wherein a first segment (74) of the upside down V-segment (72) adjacent the pinch point (52) ascends above a load plane defined between and along the first and second rods (48, 50) in a load support portion (70) of the rods (48, 50) in a direction toward the closed securing end (44) at an angle of about between 1 and 20 degrees relative to the load plane, and wherein a second segment (76) of the upside-down V-segment (72) extends from the first segment (74) to the closed securing end (44) and descends toward the load plane at an angle of about 18 degrees relative to the first segment (74) of the upside-down V-segment (72).

3. The light bag rack (10) for a bicycle of claim 2, wherein the load support portion (70) from the pinch point (52) to the open mounting end (46) is about between 4 and 20 inches and the upside-down V-segment (72) from the pinch point (52) to the closed securing end (44) is about 3.5 inches.

4. The light bag rack (10) for a bicycle of claim 1, wherein the rack (10) also includes a resilient contact sleeve (80) encompassing the closed securing end (44) and the first and second rods (48, 40) of the rack from the closed securing end (44) to the pinch point (52).

5. The light bag rack (10) for a bicycle of claim 1, wherein the rack (10) also includes a securing strap attached to the closed securing end of the rack (10) and dimensioned to detachably engage the seat post (14) to restrict movement of the rack (10) relative to the seat post (14).

6. A light bag rack (10) for a bicycle, wherein the bicycle includes a seat (12) supported on a seat post (14), the seat (12) including a first frame rail (16) and a second frame rail (18) secured to the post (14) wherein parallel portions of the first and second frame rails (16, 18) adjacent the seat post (14) are aligned about parallel to each other and extend in a direction parallel to a direction-of-travel axis of the bicycle, and wherein the parallel portions of the first and second frame rails (16, 18) define a first seat-frame distance (22) being a shortest distance between exterior edges (24, 26) of the frame rails (16, 18) forward of the seat post (14) in a direction (28) toward a front of the bicycle and the parallel portions of the first and second frame rails (16, 18) define a second seat-frame distance (32) being a shortest distance between interior edges (36, 34) of the frame rails (16, 18) rearward of the seat post (14) in a direction (30) toward a rear of the bicycle, the light bag rack (10) comprising:

a. an approximately U-shaped frame (42) having a closed securing end (44), an opposed open mounting end (46), a first rod (48) and a second rod (50) extending between the closed securing end (44) and the open mounting end (46), and the first and second rods (48, 50) defining a pinch point (52) between the securing and mounting ends (44, 46);

b. wherein the first and second rods (48, 50) define a first rack distance (54) being a shortest distance between interior edges (56, 58) of the first and second rods (48, 50) adjacent the securing end (44) so that the first rack distance (54) is greater than the first seat-frame distance (22);

c. wherein the first and second rods (48, 30) define a second rack (60) distance being a shortest distance between exterior edges (64, 66) of the first and second rods (48, 50) at the pinch point (52) so that the second rack distance (60) is less than the second seat frame distance (32), and so that a shortest distance between the first and second rods (48, 50) adjacent the pinch point (52) is less than a shortest distance between the first and second rods (48, 50) adjacent the closed securing end (44);

d. wherein the first and second rods (48, 50) of the rack (10) are sufficiently flexible so that the open mounting end (46) may expand around the exterior edges (24, 26) of the first and second seat frame rails (16, 18) forward of the seat post (14) and may compress between the first and second seat frame rails (16, 18) rearward of the seat post (14) whenever the securing end (44) of the rack (10) is positioned to contact the exterior edges (24, 26) of the first and second frame rails (16, 18) forward of the seat post (14) while the first and second rods (48, 50) adjacent the pinch point (52) of the rack (10) contact the interior edges (34, 36) of the first and second frame rails (48, 50) to secure the rack (10) to the first and second frame rails (16, 18) of the seat (12); and, e. wherein the rack (10) includes an attachment sleeve (78) dimensioned to detachably receive and secure the first and second rods (48, 50) at the open mounting end (46) of the rack (10).

7. The light bag rack (10) for a bicycle of claim 6, wherein the first and second rods (48, 50) define an upside-down V-segment (72) between the pinch point (52) and the closed securing end (44) of the rack (10), wherein a first segment (74) of the upside-down V-segment (72) adjacent the pinch point (52) ascends above a load plane defined between and along the first and second rods (48, 50) in a load support portion (70) of the rods (48, 50) in a direction toward the closed securing end (44) at an angle of about between 1 and 20 degrees relative to the load plane, and wherein a second segment (76) of the upside-down V-segment (72) extends from the first segment (74) to the closed securing end (44) and descends toward the load plane at an angle of about 18 degrees relative to the first segment (74) of the upside-down V-segment (72).

8. The light bag rack (10) for a bicycle of claim 7, wherein the load support portion (70) from the pinch point (52) to the open mounting end (46) is about between 4 and 20 inches and the upside-down V-segment (72) from the pinch point (52) to the closed securing end (44) is about 3.5 inches.

9. The light bag rack (10) for a bicycle of claim 6, wherein the rack (10) also includes a resilient contact sleeve (80) encompassing the closed securing end (44) and the first and second rods (48, 40) of the rack from the closed securing end (44) to the pinch point (52).

10. The light bag rack (10) for a bicycle of claim 6, wherein the rack (10) also includes a securing strap attached to the closed securing end of the rack (10) and dimensioned to detachably engage the seat post (14) to restrict movement of the rack (10) relative to the seat post (14).

11. A light bag rack (10) for a bicycle, the light bag rack comprising:

a. a seat (12) supported on a seat post (14), the seat (12) including a first frame rail (16) and a second frame rail (18) secured to the post (14) wherein parallel portions of the first and second frame rails (16, 19) adjacent the seat post (14) are aligned about parallel to each other and extend in a direction parallel to a direction-of-travel axis of the bicycle, and wherein the parallel portions of the first and second frame rails (16, 18) define a first seat-frame distance (22) being a shortest distance between exterior edges (24, 26) of the frame rails (16, 18) forward of the seat post (14) in a direction (28) toward a front of the bicycle and the parallel portions of the first and second frame rails (16, 18) define a second seat-frame distance (32) being a shortest distance between interior edges (36, 34) of the frame rails (16, 18) rearward of the seat post (14) in a direction (30) toward a rear of the bicycle, the light bag rack (10);

b. an approximately U-shaped frame (42) having a closed securing end (44), an opposed open mounting end (46), a first rod (48) and a second rod (50) extending between the closed securing end (44) and the open mounting end (46), and the first and second rods (48, 50) defining a pinch point (52) between the securing and mounting ends (44, 46);

c. wherein the first and second rods (48, 50) define a first rack distance (54) being a shortest distance between interior edges (56, 58) of the first and second rods (48, 50) adjacent the securing end (44) so that the first rack distance (54) is greater than the first seat-frame distance (22);

d. wherein the first and second rods (48, 50) define a second rack (60) distance being a shortest distance between exterior edges (64, 66) of the first and second rods (48, 50) at the pinch point (52) so that the second rack distance (60) is less than the second seat frame distance (32), and so that a shortest distance between the first and second rods (48, 50) adjacent the pinch point (52) is less than a shortest distance between the first and second rods (48, 50) adjacent the closed securing end (44);

e. wherein the first and second rods (48, 50) of the rack (10) are sufficiently flexible so that the open mounting end (46) may expand around the exterior edges (24, 26) of the first and second seat-frame rails (16, 18) forward of the seat post (14) and may compress between the first and second seat frame rails (16, 18) rearward of the seat post (14) whenever the securing end (44) of the rack (10) is positioned to contact the exterior edges (24, 26) of the first and second frame rails (16, 18) forward of the seat post (14) while the first and second rods (48, 50) adjacent the pinch point (52) of the rack (10) contact the interior edges (34, 36) of the first and second frame rails (48, 50) to secure the rack (10) to the first and second frame rails (16, 18) of the seat (12); and, f. wherein the rack (10) includes an attachment sleeve (78) dimensioned to detachably receive and secure the first and second rods (48, 50) at the open mounting end (46) of the rack (10).

12. The light bag rack (10) for a bicycle of claim 11, wherein the first and second rods (48, 50) define an upside-down V-segment (72) between the pinch point (52) and the closed securing end (44) of the rack (10), wherein a first segment (74) of the upside-down V-segment (72) adjacent the pinch point (52) ascends above a load plane defined between and along the first and second rods (48, 50) in a load support portion (70) of the rods (48, 50) in a direction toward the closed securing end (44) at an angle of about between 1 and 20 degrees relative to the load plane, and wherein a second segment (76) of the upside-down V-segment (72) extends from the first segment (74) to the closed securing end (44) and descends toward the load plane at an angle of about 18 degrees relative to the first segment (74) of the upside-down V-segment (72).

13. The light bag rack (10) for a bicycle of claim 12, wherein the load support portion (70) from the pinch point (52) to the open mounting end (46) is about between 4 and 20 inches and the upside-down V-segment (72) from the pinch point (52) to the closed securing end (44) is about 3.5 inches.

14. The light bag rack (10) for a bicycle of claim 13, wherein the rack (10) also includes a resilient contact sleeve (80) encompassing the closed securing end (44) and the first and second rods (48, 40) of the rack from the closed securing end (44) to the pinch point (52).

15. The light bag rack (10) for a bicycle of claim 11, wherein the rack (10) also includes a securing strap attached to the closed securing end of the rack (10) and dimensioned to detachably engage the seat post (14) to restrict movement of the rack (10) relative to the seat post (14).

\* \* \* \* \*